United States Patent
Johnson et al.

(10) Patent No.: US 10,902,002 B2
(45) Date of Patent: Jan. 26, 2021

(54) SECURE LOW-WEIGHT DATA HUB

(71) Applicant: Experian Health, Inc., Franklin, TN (US)

(72) Inventors: Daniel Erick Johnson, Costa Mesa, CA (US); Michael Peter Ochs, Franklin, TN (US); Karly Rowe, Costa Mesa, CA (US); Matthew Baltzer, Costa Mesa, CA (US)

(73) Assignee: Experian Health, Inc., Franklin, TN (US)

( * ) Notice: Subject to any disclaimer, the term of this patent is extended or adjusted under 35 U.S.C. 154(b) by 242 days.

(21) Appl. No.: 15/896,391

(22) Filed: Feb. 14, 2018

(65) Prior Publication Data

US 2019/0050457 A1   Feb. 14, 2019

Related U.S. Application Data

(60) Provisional application No. 62/542,613, filed on Aug. 8, 2017.

(51) Int. Cl.
| | | |
|---|---|---|
| *G06F 17/30* | (2006.01) | |
| *G06F 16/2457* | (2019.01) | |
| *G06F 16/27* | (2019.01) | |
| *G06F 16/25* | (2019.01) | |

(52) U.S. Cl.
CPC ........ *G06F 16/24575* (2019.01); *G06F 16/25* (2019.01); *G06F 16/27* (2019.01)

(58) Field of Classification Search
CPC ........ G06F 16/80; G06F 16/21; G06F 16/289; G06F 16/2308
See application file for complete search history.

(56) References Cited

U.S. PATENT DOCUMENTS

| | | | | |
|---|---|---|---|---|
| 9,514,327 B2* | 12/2016 | Ford | ................ | G06F 16/93 |
| 9,613,190 B2* | 4/2017 | Ford | ................ | G06F 21/62 |
| 9,762,553 B2* | 9/2017 | Ford | ................ | G06F 21/602 |
| 2006/0031301 A1* | 2/2006 | Herz | ................ | G06F 21/6254 |
| | | | | 709/206 |
| 2009/0287837 A1* | 11/2009 | Felsher | ................ | G06Q 20/367 |
| | | | | 709/229 |
| 2011/0247051 A1* | 10/2011 | Bulumulla | ................ | G06F 21/00 |
| | | | | 726/4 |
| 2012/0331567 A1* | 12/2012 | Shelton | ................ | G06Q 20/102 |
| | | | | 726/28 |

(Continued)

*Primary Examiner* — Daniel A Kuddus

(74) *Attorney, Agent, or Firm* — Knobbe, Martens, Olson & Bear, LLP

(57) ABSTRACT

Reductions to bandwidth storage resource use needed to safely and securely provide longitudinal data related to individuals to authorized parties from disparate sources are realized by employing the present disclosure. As the data related to the individual are held by various originating and aggregating databases in a variety of formats, with each database having different sharing policies, and the user similarly specifying different access permissions to personal data, a hub that manages access in a hybrid distributed/aggregated mode enables requestors to review data at a single point of access in accordance with specified access permissions from the databases or the individual. Reduced weight records, using permitted data fields, are aggregated and links to the records are provided according to the determined permission levels.

25 Claims, 4 Drawing Sheets

(56) References Cited

U.S. PATENT DOCUMENTS

| | | | | |
|---|---|---|---|---|
| 2014/0189483 A1* | 7/2014 | Awan | ............... | H04L 63/10 |
| | | | | 715/212 |
| 2014/0189818 A1* | 7/2014 | Meyer | ............... | H04L 63/08 |
| | | | | 726/4 |
| 2014/0222684 A1* | 8/2014 | Felsher | ............... | G16H 10/60 |
| | | | | 705/50 |
| 2014/0245015 A1* | 8/2014 | Velamoor | ............... | G06F 21/10 |
| | | | | 713/171 |
| 2015/0135300 A1* | 5/2015 | Ford | ............... | H04L 63/0281 |
| | | | | 726/11 |
| 2015/0163206 A1* | 6/2015 | McCarthy | ............... | G06F 21/10 |
| | | | | 713/171 |
| 2015/0310188 A1* | 10/2015 | Ford | ............... | H04L 63/0428 |
| | | | | 726/28 |

\* cited by examiner

SECURE LOW-WEIGHT DATA HUB

CROSS-REFERENCE TO RELATED APPLICATIONS

The present application claims benefit from U.S. Provisional Application No. 62/542,613, filed Aug. 8, 2017, and having the title "SECURE LOW-WEIGHT DATA HUB," which is herein incorporated by reference in its entirety.

BACKGROUND

Personal data for various individuals may be held in disparate databases managed by various entities using various formats, which complicates access to those data. Further complicating access, is that each entity may provide a portion or a different view of a single transaction. For example, a person admitted to a doctor's office and then transferred to a hospital emergency room may have personal data stored on both the doctor's and the hospital's databases for the same incident. In another example, a loan to an individual may be recorded from the perspective of the lending institution or the perspective of the seller to whom the loan balance is paid, and each party may maintain different data related to the single transaction. As companies place ever greater value on data, and privacy laws restrict the distribution of certain data, an entity holding data may only provide the data that it holds to certain requesting parties, refuse to provide certain data, or require that any data provided be protected from further distribution—all of which may vary from entity to entity and from data record to data record for a given entity. The inefficiencies associated with accessing data from the disparate entities include, but are not limited to increased bandwidth use (e.g., for repeated requestor authentication, inefficient/inconclusive record searches, duplicated result transmissions, over-sharing of data) and decreased data security (e.g., over-collection of data, storing multiple instances of a record by different entities, additional parties having access to data).

SUMMARY

Aspects of methods and systems for providing a secure low-weight data hub are provided herein. The data hub described herein provides reductions to the bandwidth needed to access data and improvements to the security of said data to provide longitudinal data related to individuals to authorized parties from disparate sources among other benefits that will be recognized by those of ordinary skill in art upon reading the specification. The data may be held by various originating and aggregating databases in a variety of formats, and each database may have different sharing policies and retention policies that the data hub overcomes to enable secure access to said data. The data hub further enables users to specify different access permissions to personal data. The data hub operates in a hybrid distributed/aggregated mode so that requestors can review data via a single point of access while respecting specified access permissions from the databases or the individual. Reduced-weight records, that make use of permitted data fields, are aggregated by the data hub for sharing with authorized parties, and links to the distributed databases for full records are provided according to the determined permission levels.

BRIEF DESCRIPTION OF THE DRAWINGS

Further features, aspects, and advantages of the invention represented by the examples described in the present disclosure will become better understood by reference to the following detailed description, appended claims, and accompanying Figures, wherein elements are not to scale so as to more clearly show the details, wherein like reference numbers indicate like elements throughout the several views, and wherein:

DETAILED DESCRIPTION

Aspects of methods and systems for providing a secure low-weight data hub are provided herein. The data hub described herein provides reductions to the bandwidth needed to access data and improvements to the security of said data provide longitudinal data related to individuals to authorized parties from disparate sources among other benefits that will be recognized by those of ordinary skill in art upon reading the specification. The data may be held by various originating and aggregating databases in a variety of formats, and each database may have different sharing policies and retention policies that the data hub overcomes to enable secure access to said data. The data hub further enables users to specify different access permissions to personal data. The data hub operates in a hybrid distributed/aggregated mode so that requestors can review data via a single point of access while respecting specified access permissions from the databases or the individual. Reduced-weight records, making use of permitted data fields, are aggregated by the data hub for sharing with authorized parties, and links to the distributed databases for full records are provided according to the determined permission levels.

As used herein, longitudinal data for an individual provides a timeline view of one or more aspects of that individual, which are made up of several data records that are created across different times and by one or more entities relating to that individual. Although examples are given herein primarily in terms of longitudinal data for human individuals, one of ordinary skill in the art will appreciate that the teachings of the present disclosure may be applied to non-human individuals (e.g., the longitudinal health records over the life of an animal) and inanimate objects that are individually identifiable (e.g., the repair records for vehicle).

Figure 1:
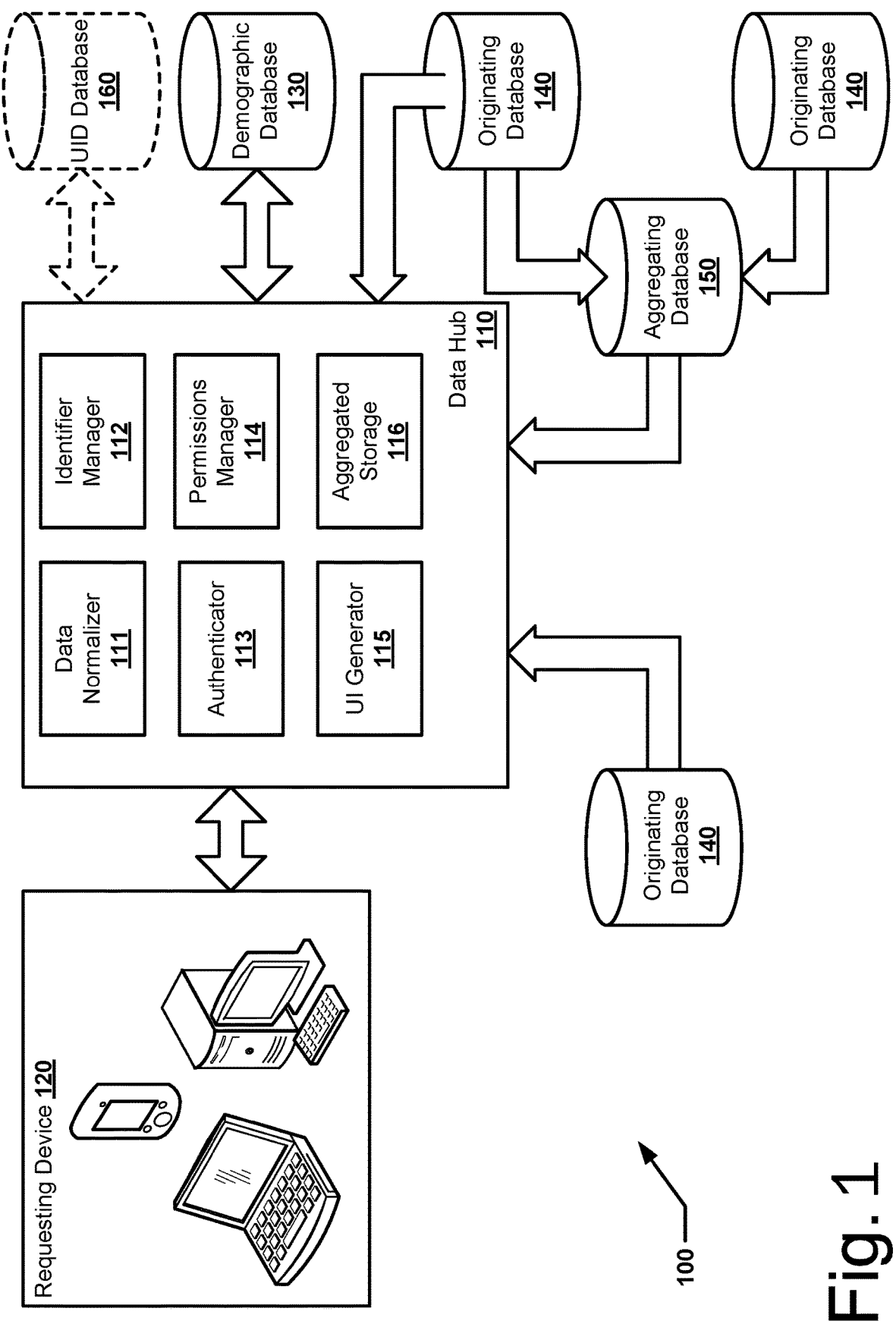
FIG. 1 illustrates an example operating environment in which various aspects of a data hub may operate.

FIG. 1 illustrates an example operating environment 100 in which various aspects of a data hub 110 may operate. As illustrated, a data hub 110 is in communication with one or more requesting devices 120, a demographic database 130, one or more originating databases 140, one or more aggregating databases 150, and, in some implementations, a universal UID database 160. The originating databases 140 provide activity records related to persons to one or more of the data hub 110 and the aggregating databases 150. Each of the data hub 110, requesting devices 120, demographic databases 130, originating databases 140, aggregating databases 150, and universal UID databases 160 may be implemented on or by one or more computing devices 400 discussed in greater detail in regard to FIG. 4. The computing devices include, but are not limited to: servers, desktop computers, laptops computers, tablets, smart phones, personal digital assistants, and distributed systems that are run on multiple computing devices. Although not illustrated, one of ordinary skill in the art will appreciate that various intermediary computing and networking devices may exist between the illustrated elements of the operating environment 100 to facilitate communications between the various enumerated elements, for example via the Internet and one or more Intranets.

The data hub 110 provides a centralized access point for the requesting devices 120 to data held by the various originating databases 140 and aggregating databases 150 in various data records.

The requesting device 120 represents the computing device of a requesting user, who is seeking access to longitudinal data related to a person via the data hub 110. In various aspects, the requesting device 120 runs a specific program to access the data hub 110, but may also access the data hub 110 via an Application Program Interface (API) or via a thin-client that is configured to request and return the longitudinal data via a web browser. Requesting users may come in several types, including: individual persons requesting longitudinal data related to themselves, persons or organizations authorized by the person to whom the longitudinal data are related to act in that person's stead or access those data (e.g., a parent of a minor, a legal guardian, a holder of a power of attorney, a physician), or a person or organization that has not been explicitly authorized to access those data, but is interested in the given person to whom the data are related. Depending on the type of requestor and how the requesting device 120 accesses the data hub 110, the data hub 110 may grant or deny access to none, some, or all of the data records to which it has access for a given person and that the requesting device 120 has requested.

Originating databases 140 represent the computing device of a holder of original data records. For example, a school may generate and store data records for the grades and disciplinary actions for its students that are stored in an originating database 140. In another example, a physician's group may generate medical records for various individuals who are treated by that group that are stored in its originating database 140. In still a further example, an automotive repair facility may maintain records on the vehicles that are serviced and repaired at that facility in its originating database 140.

In various aspects, an originating database 140 may act as a requesting device 120 or be associated with a requesting device 120 to request and receive the data records from a different party that are needed for its internal use. For example, a first physician's group may request the medical history of a patient from the data hub 110 so that ongoing treatment of the individual may take into account the medical data records associated with that individual that were generated by prior physicians who treated that individual. The data hub 110 is therefore configured and operable to query, on behalf of the requesting device 120, records that are stored at the data hub 110 and the data sources in communication with the data hub 110 (originating databases 140 and aggregating databases 150) based on an identity of the individual to return relevant longitudinal data to the requestor in accordance with the privacy settings of the individual data records.

Additionally, an originating database 140 may act as a primary data source for data records that it has received from other parties. For example, the scholastic history for a student transferring from a first institution may be held by the originating database 140 of the first institution as well as the originating database 140 of a second institution to which the student has been transferred. The data hub 110 is therefore operable and configured to distinguish the sources of data records so that the various privacy policies set by those sources will be respects after data are shared, and so that duplicate records are not returned to a requestor. Continuing the above example, a requestor (e.g., an enrollment officer at a third institution, the student, a parent) asking for the longitudinal data of a given student's academic history may receive one set of academic data records that encompass the student's academic history instead of both set of records from the originating databases 140 of the first and second institutions.

Aggregating databases 150 represent the computing device of a holder of data records that have been gathered from one or more originating databases 140. For example, a school district may aggregate data records for the grades and disciplinary actions for students at several schools in the district at an aggregating database 150 gathered from the individual originating databases 140 of the schools in that district. A data clearinghouse may act as an aggregating database 150 when it aggregates various records for distribution to various parties.

The originating databases 140 and aggregating databases 150 may provide data records to the data hub 110 individually, in batches, at predetermined times, in response to a predetermined new records being accumulated by the originating databases 140 or aggregating databases 150, in response to a pull request from the data hub, and combinations thereof. The originating databases 140 retain copies of the data records transmitted to the data hub 110 or an aggregating database 150. The aggregating database 150 may retain copies of data records for a predetermined length of time, until transmission to the data hub 110, or permanently. The data hub 110, to reduce the storage space requirements, respect data-holders' privacy requirements, reduce bandwidth consumption, and provide other benefits to the functioning of the associated devices, stores one or more of the data records, links to the original data records on their associated originating database 140 or aggregated database 150, and reduced-weight data records (being data records trimmed of some fields).

To provide access to the records held by their various data sources to authorized requestors, the data hub 110 includes various subsystems, including: a data normalizer 111, an identifier manager 112, an authenticator 113, a permissions manager 114, a user interface (UI) generator 115, and aggregated storage 116. In some aspects, the data hub 110 maintains a demographic database 130 as a subsystem, while in other aspects, the data hub 110 is in communication with an externally managed demographic database 130. In some aspects, the data hub 110 maintains a UID database 160 as a subsystem, while in other aspects, the data hub 110 is in communication with an externally managed UID database 160. Each of the subsystems may be implemented as one or more separate computing devices, software applications, program modules, or the like.

The data normalizer 111 is configured or operable to convert data that are received from the various data sources from the formats in which they are received to a standardized format used by the data hub 110. In various aspects, the data fields in the received records are rearranged, merged, split, or omitted to normalize them. In other aspects, the data in the data fields are converted (e.g., to/from metric, to/from Month-Day-Year/Year-Month-Day/Day-Month-Year), truncated (e.g., nine digit ZIP codes to five digit ZIP codes), and expanded or supplemented using additional data related to the data source or person described in the data record (e.g., inserting a telephone area code, correcting a known misspelling/typo of a name, adding a middle initial).

The identifier manager 112 is configured or operable to associate Unique Identifiers (UID) with data records based on the persons described in those data records. In various aspects, the identifier manager 112 works in conjunction with a demographic database 130 to identify a given person uniquely based on the demographic data in the data record matching the demographic data held by the demographic database 130. Demographic data include, but are not limited to: name, date of birth, date of death, address, other identifier numbers, known associates (e.g., employer, spouse, parent), telephone number, email address, etc. The identifier manager 112 uses a probabilistic matching algorithm to determine whether the information included in a data record indicate whether the person described therein is a person who has previously been associated with a UID (and if so, what the UID is) or whether a new UID should be created as the described person is not associated with prior-gathered data records. The demographic data used by the identifier manager 112 are shared with the demographic database 130 so that as demographic details for a given person are observed (e.g., a change of address or name, a misspelling/mis-entry of a data field) the demographic database 130 will store those data for later matching to identify the person again in the future.

In various aspects, the identifier manager 112 works in conjunction with a UID database 160 to identify a given person based on a UID included in the data record. In some implementations, the identifier manager 112 is configured or operable to perform a transactional PIN-ing process, for example, where a data record is associated with a UID as the data record is received from an outside data source (e.g., originating database 140). In other implementations, the identifier manager 112 is configured or operable to perform a batch PIN-ing process, for example, where data records received from one or more outside data sources (e.g., originating database(s) 140) are associated with UIDs in an offline PIN-ing process. In some examples, UIDs that are associated with data records in the offline process are communicated to the data sources from the data records are received or are stored in association with those people the data records describe in a UID database 160.

In some implementations, an existing or new UID for a particular person is shared with an originating database 140, such that when a forthcoming data record associated with the particular person is received from the originating database, the data record can include the shared UID. For example, in such an implementation, processing of a data record by the identity manager 112 in a PIN-ing process can be reduced or eliminated.

In some implementations, when associating a UID with a data record based on the person described in that data record, the identifier manager 112 is configured or operable to identify a given person uniquely based on a UID appended to the data record, wherein the appended UID can be an entity-specific UID (e.g., specific to the originating database 140 from which the data record is received, specific to the requestor, or specific to the data hub 110) or a universal UID (e.g., used by a plurality of data sources, used by a plurality of data hubs). For example, the identifier manager 112 is configured or operable to match the UID appended to the data record to a matching UID held by the UID database 160. The UID database 160 represents the computing device of a holder of UIDs associated with a person. For example, the UID database 160 is configured or operable to store one or a plurality of UIDs associated with a person, such as entity-specific UIDs and/or a universal UID.

In some implementations, the UID database 160 is a relational database where a person has multiple UIDs associated with him/her, but a particular UID is only associated with one person. In some implementations, the UID database 160 stores an existing root UID associated with a person, wherein other existing UIDs associated with the person are map-able to the existing root UID. According to an aspect, the existing root UID for a person can be a universal UID known to and used by a plurality of data sources (e.g., originating databases 140). When the identifier manager 112 matches an appended UID to an existing UID stored in the UID database 160, the identifier manager is configured or operable to assign the root UID or another associated UID for the associated person as the UID to the data record.

In some examples, the UIDs stored in the UID database 160 can be "certified" UIDs provided by one or more "certified" UID providers, wherein a "certified" UID provider is a source that has been officially recognized as meeting a certain standard for providing a UID.

The authenticator 113 is configured or operable to provide various requestors with various access rights to longitudinal data via the data hub 110. In some aspects, the authenticator 113 provides access to longitudinal data via username/password pairs, authentication tokens received from a portal application running on a requesting device 120, or via a public record access rights scheme. In some aspects, the authenticator 113 is also in communication with the demographic database 130 to determine whether persons accessing the data hub 110 are who they claim to be. For example, a requestor claiming to be "John Doe" may be provided with several addresses, high schools, etc. that are associated with various different persons named "John Doe" by the demographic database 130 to determine which "John Doe" (if any) the requestor is.

The permissions manager 114 is operable or configured to allow different requestors access to different portions of the longitudinal data accessible for a given individual via the data hub 110. For example, various persons may specify that only authorized parties may be given access to their longitudinal data, and the permissions manager 114 will restrict access to those data accordingly. In another example, a given data source may specify that a given data record should not be aggregated or have certain data fields aggregated or shared, which the permissions manager 114 will use when receiving data records or requests for data records to ensure that the data retention and sharing policies set by the various data sources are respected by the data hub 110.

The UI Generator 115 is operable or configured to create a user-navigable interface for viewing and manipulating the data records accessible by a given requestor to thereby provide the longitudinal data. In various aspects, the longitudinal data are presented as a timeline based on the dates associated with the data records. The data records may be presented as controls in the timeline that allow a requestor a condensed view of the record(s) associated with the event, that may be selected for greater information related to the event and/or links to the data records for that event. For example, a medical longitudinal data record may have a UI generated by the UI generator 115 (and transmitted to the requesting device 120) that identifies all of the doctor, dentist, chiropractor, physical therapist, emergency room, etc. visits that have been observed in records available to the data hub 110. The data records may include several co-related subevents that are condensed in the UI into a single event (e.g., a torn tendon event may include data records for ER admission, X-ray records, surgery, physical therapy, billing, pharmacy and so forth). In other aspects, the UI includes controls to filter which types of events are shown in the timeline from the available data records. In further aspects, the UI includes controls to provide links to the data sources to thereby retrieve the data record(s) in question from their sources (or if aggregated, from the data hub 110) based on a selection of a reduced-weight record presented in the UI.

The aggregated storage 116 is configured or operable to store various received data records from the data sources (i.e., originating databases 140 or aggregating databases 150) for later retrieval by the data hub 110 for reduced bandwidth provision to various requestors. Additionally, various links that point to the full-weight data records stored by the data are stored in the aggregated storage 116 of the data hub 110 based on the permissions set by those data sources (and storage policies of the data hub) identified by the permissions manager 114. These data records and links are stored in the standardized format of the data hub 110 and are indexable and searchable by the UID (e.g., entity-specific UID, universal UID) associated with the person described in the data records determined by the identifier manager 112.

Figure 2:
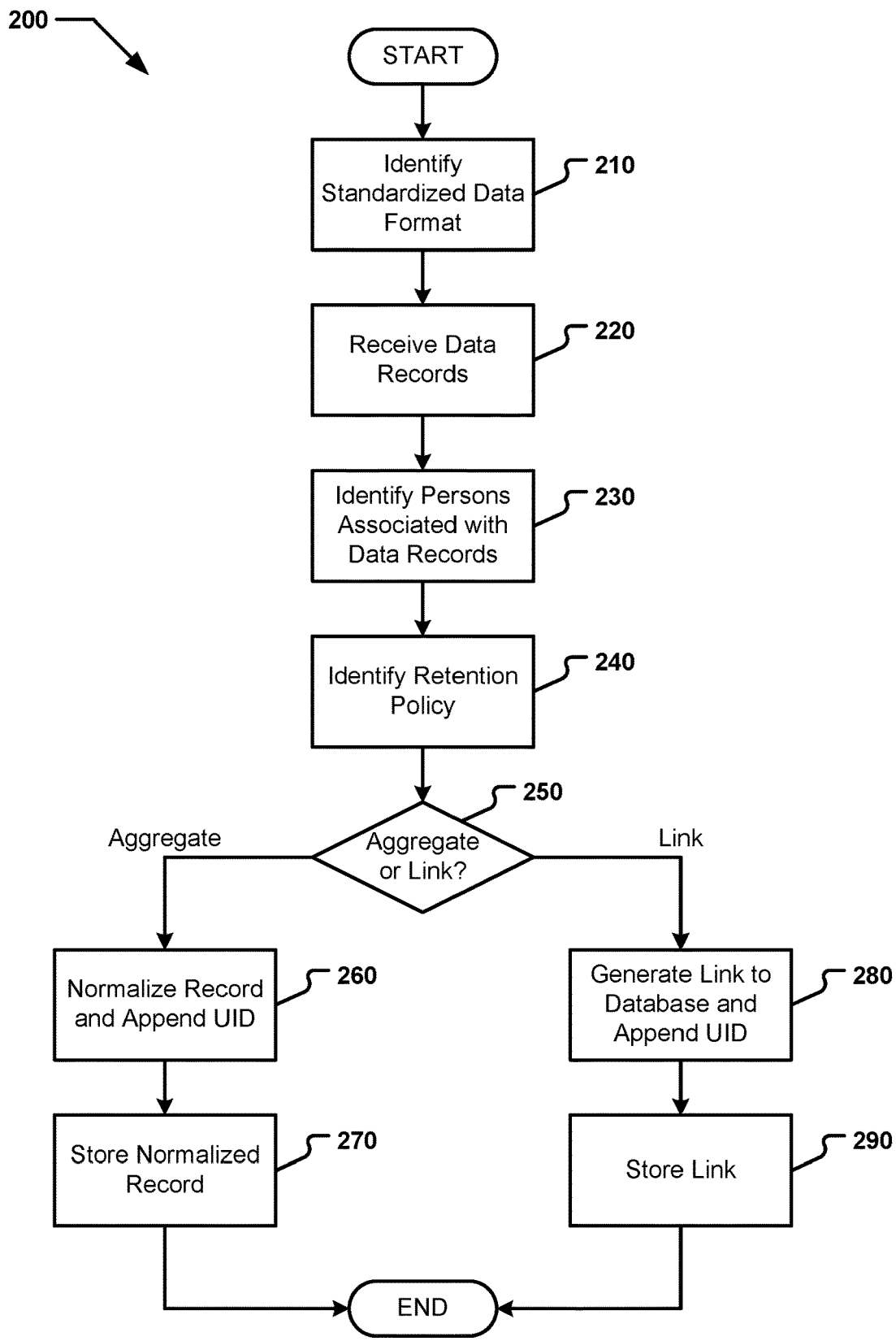
FIG. 2 is a flow chart showing general stages involved in an example method for providing building and managing a data hub for providing secure access to longitudinal data from various sources.

FIG. 2 illustrates a flow chart showing general stages involved in an example method 200 for providing building and managing a data hub 110 for providing secure access to longitudinal data from various sources. Method 200 begins at OPERATION 210, where a standardized data format for storing various data records is identified. The data records received at OPERATION 220 may be received from a plurality of data sources according to myriad data formats and levels of completion (i.e., some fields may be omitted or included in individual data records sharing the same format). The data records received at OPERATION 220 may be received based on a pull request from the data hub 110 to the data sources, as a push from the data sources to the data hub 110, as individual records, as batches or records, as records associated with one individual, as records associated with multiple individuals, etc.

At OPERATION 230 the data records received at OPERATION 220 are parsed to identify the persons described in those data records. In various aspects, the various demographic data in the records are used to identify specific persons in those records. For example, demographic data may include, but are not limited to: names, titles, addresses, related parties, entity providing the data record/service to which the data record is associated, date or birth, and identifiers included in the data record (e.g., a social security number, a customer loyalty number, a bank account). In various aspects, the data records include a UID, such as an entity-specific UID (e.g., specific to the sender, specific to the requestor, specific to the data hub 110) or a universal UID (e.g., a UID used by a plurality of data sources and/or data hubs, a UID provided or certified by an entity that is officially recognized as meeting a certain standard for providing a UID), which is used to identify specific persons in those records.

These demographic data and, if provided, UIDs are used to identify the persons in the records and assign an existing or new Unique Identifier (UID) for that person. In various implementations, a UID included with a data record is used to query the UID database 160 to identify a person associated with that appended UID and to identify if another UID (i.e., one or more UIDs) is also associated with that person. As an example, a data source can associate a particular UID with a person and include (append) that UID with a data record (of that person) directed to a requesting device 120. For example, the appended UID can be a particular UID provided by the requestor of the data record (e.g., an existing UID previously associated with the person), a particular UID used and assigned by the data source, a particular UID used by one or more data hubs 110, or a particular UID assigned by an entity officially recognized as meeting a certain standard for providing a UID. In some implementations, in the UID database 160, a root UID is associated with each unique person. For example, a person in the database can have one or multiple UIDs associated with him/her, and one of those UIDs or another identifier can be assigned as the root UID for the person and be associated with the data record of that person.

In various aspects, once the person in the data record is associated with a UID (new or existing), the demographic data in the data record are passed to a demographic database 130 so that as additional demographic data are collected regarding that person (e.g., a new address, a change of name, a new nickname, a new misspelling/mis-entry of a demographic field), those demographic data may be associated with that person for later identification in association with the UID. In some implementations, a previously-associated UID, an entity-specific UID, or a universal UID for a person is transmitted to a data source (e.g., originating database 140) from which the data record is received, such that a forthcoming data record associated with the person can include the shared UID for enabling a more efficient PIN-ing process. In some implementations, when the person in the data record is associated with a new UID, the new UID is passed to a UID database 160 so that other data sources or data hubs 110 can reference the UID database for accessing the new UID associated with a person, and in some cases, use the new UID to include in a data record of that person for later identification.

Proceeding to OPERATION 240, a retention policy is identified for the data record received in OPERATION 220. Depending on various laws, preferences set by the person identified in the data record in OPERATION 230, and policies set by the data source from which the data record was received, some or all of the data fields in the data record may be marked as not to be shared, not to be aggregated (e.g., the data source is to retain control of the data record), not to be collated, etc.

At DECISION 250 it is determined whether a given received data record is to be aggregated by the data hub 110 or linked by the data hub 110 for later retrieval by requesting parties. When it is determined that the data record may be aggregated, method 200 proceeds to OPERATION 260 and OPERATION 270 to aggregate the data record. When it is determined that the data record is not to be aggregated, method 200 proceeds to OPERATION 280 and OPERATION 290 to generate and store a link to the data record. In various aspects, it may be determined to generate a link instead of aggregating the data based on policies set by the data source that dictate that the data source will maintain control of the record (e.g., to maintain data security), a size of the data record (e.g., to reduce the use of storage resources by maintaining one copy of the data record), or an equivalency of the data record (e.g., data records from multiple parties related to one recorded event may have only one record aggregated and the others stored as links). In various aspects, data records identified as relating via an equivalency may be identified by included record numbers (e.g., tracking numbers, invoices), similar or nearby dates, data record types (e.g., shipping and receipt notices; intake and transfer notices; general practitioner record and specialist record) etc.

At OPERATION 260 the given data record is converted from the format in which it was received to the standardized data format identified in OPERATION 210—the data record is normalized to the standardized format used by the data hub 110. In various aspects, missing data fields from the received data record are left blank or are filled in according to data associated with the identified person when normalized. In other aspects, data fields are rearranged, truncated, dropped, relabeled, converted (e.g., from metric to standard units), combined (e.g., a first name field and a last name field merged into a name field), split (e.g., a name field broken into a first name field and a last name field), etc. The UID assigned to or associated with the person in OPERATION 230 is then appended to the normalized data record for later retrieval based on searches using that UID.

Proceeding to OPERATION 270, the normalized data record is stored by the data hub 110 for later retrieval, and method 200 may then conclude.

At OPERATION 280 a link is generated for the received data record. Instead of storing the data record that was received in OPERATION 220, the stored link provides a fast and secure method to re-request the data record from the data source by the data hub 110 or for the requesting party to directly request the data record maintained by the data hub 110. The link includes information extracted from the data record so that a requestor will know what sort of data record the link points to. For example, a link to a medical record for a doctor's office visit may include an event type (e.g., doctor's office visit, medication X prescribed, broken arm), a date, and contact information, but may exclude the detailed notes for that visit. The UID identified for the person in OPERATION 230 is then appended to the link for later retrieval based on searches using that UID.

Proceeding to OPERATION 290, the link to the data record is stored by the data hub 110 as a pointer to the data record for (potential) later retrieval from the data source from which that data record was received, and method 200 may then conclude.

Figure 3:
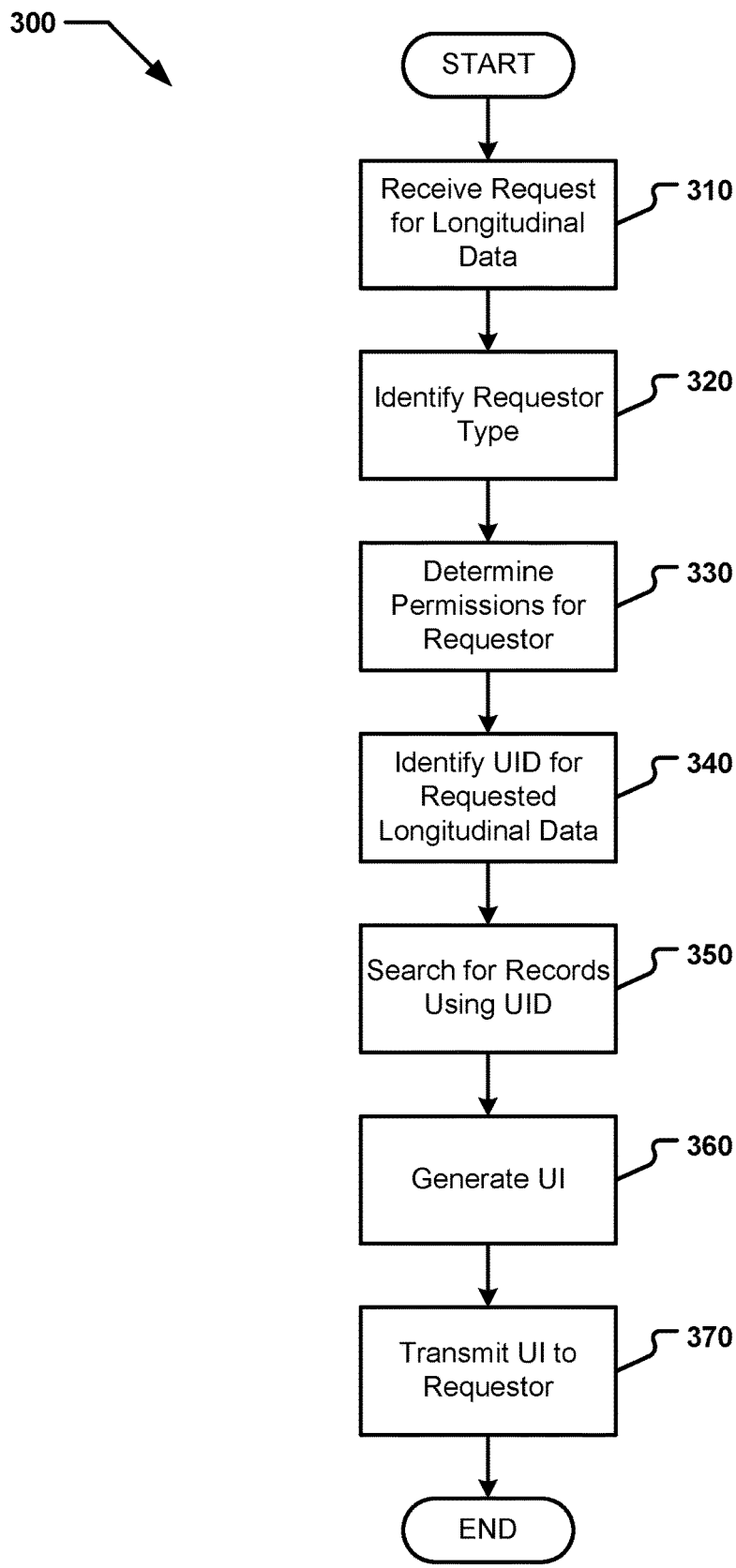
FIG. 3 is a flow chart showing general stages involved in an example method for providing secure access to longitudinal data from various sources via a data hub.

FIG. 3 illustrates a flow chart showing general stages involved in an example method 300 for providing secure access to longitudinal data from various sources via a data hub 110. Method 300 begins at OPERATION 310, where a request is received by the data hub 110 for longitudinal data. The request identifies a person for whom the longitudinal data is requested and identifies the requestor. In various aspects, the person is identified by a name, an identifier number, one or more pieces of demographic information, and combinations thereof included in the request. Similarly, the requestor is identified by a name, identifier number, one or more pieces of demographic information included in the request.

Proceeding to OPERATION 320, the type of requestor is identified. In various aspects, the type of requestor may vary, and the relationship between the requestor and the person whose longitudinal data are of interest will impact what information are available to the requestor and from which sources. For example, first party requestors are requestors seeking longitudinal data about themselves. These first party requestors may specify that they are seeking personal information about themselves in the request to be thereby be identified as the given person. In another example, second party requestors are requestors who are authorized by the person to access that person's longitudinal data in that person's stead or behalf. These second party requestors state in the request what their authorizing relationship is, either implicitly (e.g., via a login to a portal for authorized persons/parties) or explicitly (e.g., signing that the requestor is a parent, legal guardian, or holder of a power of attorney), and may link to an authorizing document to verify the extent to which the requestor is granted permission to view longitudinal data for the person. In a further example, third party requestors are requestors who have not established that they are the person in interest or have been authorized by the person of interest. Unless a requesting party can establish that it is a first party requestor or a second party requestor, it is identified as a third party requestor.

At OPERATION 330 the permissions for the requestor are determined based on the requestor type. The permissions establish what data the requestor are permitted by the data sources or the person in interest to view. For example, a first party requestor may be permitted to see longitudinal data comprised of all of the available data records and fields thereof, whereas a third party requestor may not be permitted to view any of the longitudinal data. In another example, an authorized institution may provide different permission levels to different employees—in an authorized hospital a physician may be provided full access to a patient's longitudinal data, a physical therapist limited access, and a janitor no access.

In various aspects, determining the permissions for a requestor entails authenticating the requestor. Authentication includes logging into a portal (e.g., via username/password) to identify the party in requests sent from the portal, correctly answering demographic questions that only the requestor should be able to correctly answer, verifying permission documents (e.g., verify a signature), and the like.

Method 300 proceeds to OPERATION 340, where one or more unique identifiers (UIDs) for the person of interest are identified from the data included in the request. As one example, a request may specify that longitudinal data is desired for a "John Doe." As will be appreciated, many persons may share the name "John Doe" or the name "John Doe" may be misspelled (e.g., from "Johnathan Doe"), shortened (e.g., from "Jonathon" to "Jon"), or otherwise corrupted, which will make identifying the particular John Doe of interest by name alone challenging. Other demographic data in the request are used to narrow down the particular person of interest. Such demographic data include, but are not limited to: address, date or birth, employer, other identifier numbers, and relationships to other individuals (e.g., to a second party requestor of a parent).

The data hub 110 will determine whether an existing UID can be assigned to the person of interest or whether a new UID should be created in associated with the person on interest based on a probabilistic matching algorithm.

As another example, a request may specify that longitudinal data is desired for "12345." As will be appreciated, "12345" can be an existing UID previously associated with a particular person (e.g., John Doe from the above example) by the requester, by the requestee, by the data hub 110, or by a third-party. In some cases, such as when the UID (e.g., "12345") is assigned to the person by an entity other than the requestee, the UID can be mapped (e.g., using the UID database 160) to an UID used by the requestee in association with that person.

Once the person of interest in the request has been identified and correlated to a UID, the data hub 110 will search for records based on the UID at OPERATION 350. The records searched include aggregated records stored by the data hub 110 as well as links stored by the data hub 110 to the original data records held by an originating database 140 or an aggregating database 150. In various aspects, the requestor's permission level determines which (if any) data records that include the UID are returned and what portions of those records are returned.

The records returned in association with the UID are used to generate a User Interface (UI) at OPERATION 360 that displays the longitudinal data in accord with the requestor's permission level. In various aspects, these data are reduced in weight so that the requestor may see identifying information related to the events that generated the data records without seeing the entire data record (and without requiring the processing power or bandwidth to access the entire data record). For example, a mechanic calling up the history of a vehicle may not be interested in seeing the details of every recorded oil change of the vehicle, merely the latest oil change, in which case the prior records are reduced in weight to a date and event type (e.g., oil change on 1 Jan. 2000) and the latest oil change is provided as a full-weight record (e.g., oil change on 1 Jun. 2000, 4 qts 10-40, filter replaced, 20 k miles, additional notes). The UI includes controls by which an authorized requestor may obtain the full data record related to a given reduced weight data record. For example, if the mechanic in the above example were provided a reduced weight record of "minor body work, 1 Oct. 2005" and actuated a control associated with a full data record request, additional details from another mechanic may be obtained by the data hub 110 to provide to the requesting mechanic, or the requesting mechanic may be provided the contact details of the other mechanic to request details therefrom.

In other aspects, a requestor may be provided a longitudinal medical history that highlights various events of interest to a current event. For example, a physical therapist may be authorized to view a complete medial longitudinal record for a person, but may exclude data records for childhood immunizations, wellness visits, infections, etc., and only be provided data records related to prior musculo-skeletal problems.

At OPERATION 370 the UI is transmitted to the requestor for display on the requesting device 120, and method 300 may conclude.

Figure 4:
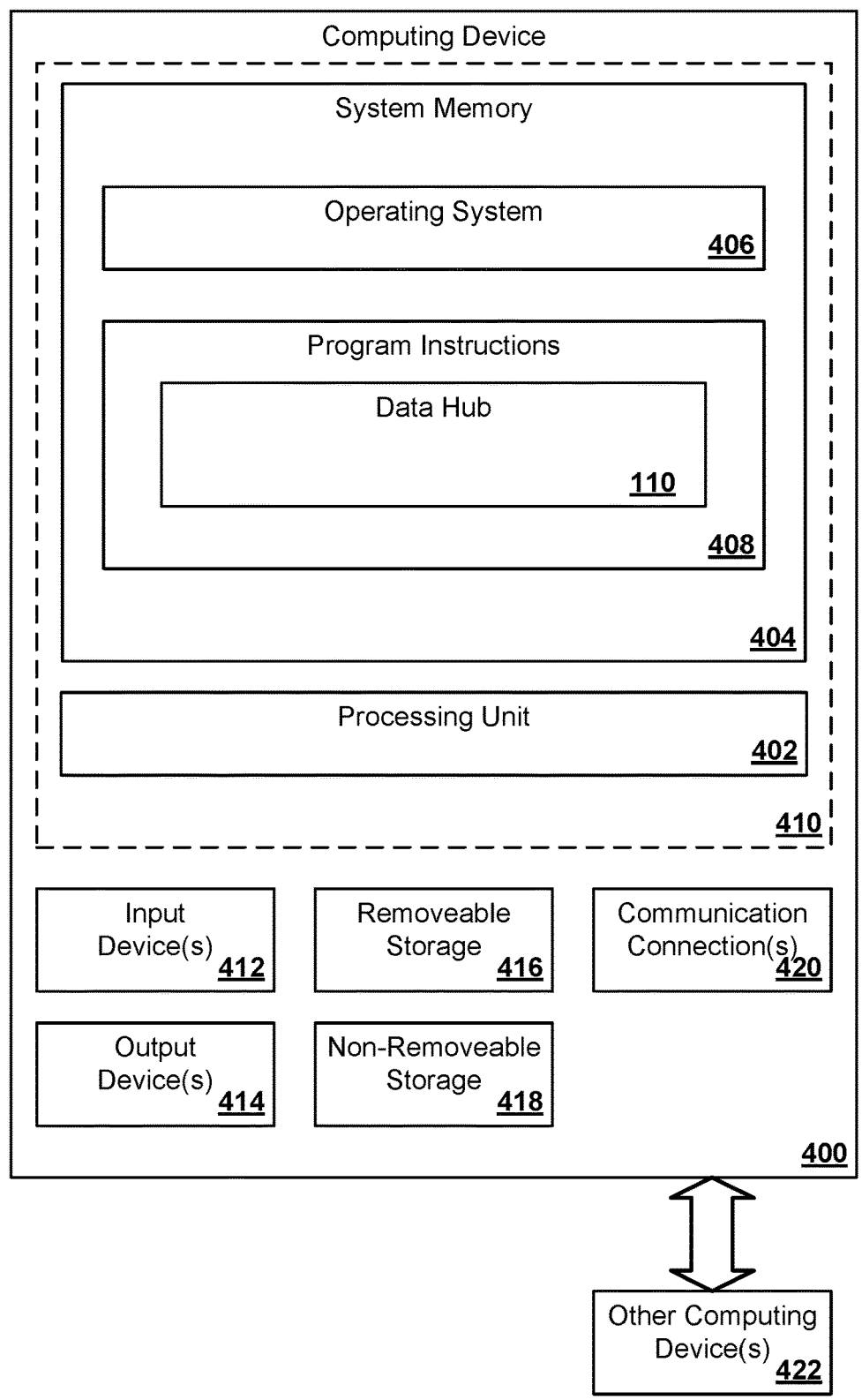
FIG. 4 is a block diagram illustrating example physical components of a computing device with which aspects of the system may be practiced.

FIG. 4 is a block diagram illustrating physical components of an example computing device with which aspects may be practiced. The computing device 400 may include at least one processing unit 402 and a system memory 404. The system memory 404 may comprise, but is not limited to, volatile (e.g. random access memory (RAM)), non-volatile (e.g. read-only memory (ROM)), flash memory, or any combination thereof. System memory 404 may include operating system 406, one or more program instructions 408, and may include sufficient computer-executable instructions for an application to enable a system providing a data hub 110, which when executed, performs functionalities as described herein, such as, for example, methods 200 and 300. Operating system 406, for example, may be suitable for controlling the operation of computing device 400. Furthermore, aspects may be practiced in conjunction with a graphics library, other operating systems, or any other application program and is not limited to any particular application or system. This basic configuration is illustrated by those components within a dashed line 410. Computing device 400 may also include one or more input device(s) 412 (keyboard, mouse, pen, touch input device, etc.) and one or more output device(s) 414 (e.g., display, speakers, a printer, etc.).

The computing device 400 may also include additional data storage devices (removable or non-removable) such as, for example, magnetic disks, optical disks, or tape. Such additional storage is illustrated by a removable storage 416 and a non-removable storage 418. Computing device 400 may also contain a communication connection 420 that may allow computing device 400 to communicate with other computing devices 422, such as over a network in a distributed computing environment, for example, an intranet or the Internet. Communication connection 420 is one example of a communication medium, via which computer-readable transmission media (i.e., signals) may be propagated.

Programming modules, may include routines, programs, components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Aspects may also be practiced in distributed computing environments where tasks are performed by remote processing devices that are linked through a communications network. In a distributed computing environment, programming modules may be located in both local and remote memory storage devices.

Furthermore, aspects may be practiced in an electrical circuit comprising discrete electronic elements, packaged or integrated electronic chips containing logic gates, a circuit using a microprocessor, or on a single chip containing electronic elements or microprocessors (e.g., a system-on-a-chip (SoC)). Aspects may also be practiced using other technologies capable of performing logical operations such as, for example, AND, OR, and NOT, including, but not limited to, mechanical, optical, fluidic, and quantum technologies. In addition, aspects may be practiced within a general purpose computer or in any other circuits or systems.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, microcode, etc.) may provide aspects discussed herein. Aspects may take the form of a computer program product on a computer-usable or computer-readable storage medium having computer-usable or computer-readable program code embodied in the medium for use by, or in connection with, an instruction execution system.

Although aspects have been described as being associated with data stored in memory and other storage mediums, data can also be stored on or read from other types of computer-readable media, such as secondary storage devices, like hard disks, floppy disks, or a CD-ROM, or other forms of RAM or ROM. The term computer-readable storage medium refers only to devices and articles of manufacture that store data or computer-executable instructions readable by a computing device. The term computer-readable storage media does not include computer-readable transmission media.

Aspects of the present invention may be used in various distributed computing environments where tasks are performed by remote processing devices that are linked through a communications network.

Aspects of the invention may be implemented via local and remote computing and data storage systems. Such memory storage and processing units may be implemented in a computing device. Any suitable combination of hardware, software, or firmware may be used to implement the memory storage and processing unit. For example, the memory storage and processing unit may be implemented with computing device 400 or any other computing devices 422, in combination with computing device 400, wherein functionality may be brought together over a network in a distributed computing environment, for example, an intranet or the Internet, to perform the functions as described herein. The systems, devices, and processors described herein are provided as examples; however, other systems, devices, and processors may comprise the aforementioned memory storage and processing unit, consistent with the described aspects.

The description and illustration of one or more aspects provided in this application are intended to provide a thorough and complete disclosure the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

We claim:

1. A method for providing secure access to longitudinal data including an electronic longitudinal data record, comprising:

identifying a plurality of data formats used by a plurality of databases that store a plurality of data records associated with various persons;

identifying a standardized data format;

receiving a data record of the plurality of data records associated with a person from a database of the plurality of databases according to a data format of the plurality of data formats;

identifying, based on contents of the data record associated with the person, a unique identifier for the person;

identifying, based on the unique identifier and an identity of the database from which the data record was received, a retention policy;

in response to determining that the retention policy aggregates received data records:

when the unique identifier is not included in the contents of the data record, appending the unique identifier to the data record associated with the person;

normalizing the data record associated with the person from the data format into the standardized data format; and storing the normalized data record in association with prior data records for the person;

in response to determining that the retention policy does not aggregate received data records:

generating a link to the database from which the data record was received, wherein the link includes a portion of the contents of the data record;

appending the unique identifier to the link; and storing the link in association with the prior data records for the person;

providing the electronic longitudinal data record for the person comprising a timeline view according to dates of several source data records created at different times and by disparate entities according to one or both of the link to the database from which the data record was received in association with the prior data records for the person and the normalized data record in association with the prior data records for the person; and providing a user interface that includes the electronic longitudinal data record comprising the timeline view for the person according to the dates of the several source data records.

2. The method of claim 1, wherein identifying the unique identifier for the person comprises:

extracting demographic content from the data record;

querying a demographic database with the demographic content;

determining whether the demographic content matches with a demographic information set stored in the demographic database associated with an existing unique identifier;

in response to determining that the demographic content matches a demographic information set stored in the demographic database associated with the existing unique identifier:

assigning the existing unique identifier as the unique identifier; and updating the demographic information set with the demographic content; and in response to determining that the demographic content does not match any demographic information set stored in the demographic database associated with the existing unique identifier:

creating a new unique identifier for the person;

assigning the new unique identifier as the unique identifier;

storing the demographic content as a new demographic information set; and associating the new unique identifier with the new demographic information set.

3. The method of claim 2, wherein the demographic content includes at least one of:

a name of the person;

an address associated with the person;

a date of birth associated with the person;

a governmental identifier associated with the person; and a commercial identifier associated with the person.

4. The method of claim 1, wherein identifying the unique identifier for the person comprises:

extracting an appended unique identifier from the data record;

querying a unique identifier database with the appended unique identifier;

determining whether the appended unique identifier matches with an existing unique identifier stored in the unique identifier database associated with the person; and in response to determining that the appended unique identifier matches an existing unique identifier stored in the unique identifier database associated with a person, assigning an existing root unique identifier associated with the person as the unique identifier, wherein the root unique identifier is map-able to the appended unique identifier, the existing unique identifier, and any other unique identifier stored in the unique identifier database that is associated with the person.

5. The method of claim 4, wherein the root unique identifier is a universal unique identifier that is utilized by a plurality of the plurality of databases from which data records are received.

6. The method of claim 4, wherein at least one of the appended unique identifier and the existing unique identifier is an entity-specific unique identifier.

7. The method of claim 1, wherein the link provides a pointer to the database from which a related data record was received and a brief synopsis of the data record.

8. The method of claim 1, wherein the plurality of databases include:
a primary data source from which data records originate; and
a clearinghouse that has aggregated data records that have originated from one or more primary data sources.

9. A non-transitory computer readable medium for providing secure access to longitudinal data including an electronic longitudinal data record, comprising:
receiving, from a requestor, a request for longitudinal data related to a person;
identifying the requestor from whom the request was received;
determining permissions associated with the requestor in relation to the longitudinal data related to the person;
identifying a unique identifier for the person;
searching for data records related to the person based on the determined permissions and the unique identifier, the data records including a date and an event type;
providing the electronic longitudinal data record for the person comprising a timeline view according to dates of several source data records created at different times and by disparate entities according to one or both of a link to a database from which a data record was received in association with prior data records for the person and a normalized data record in association with the prior data records for the person
generating a user interface including the electronic longitudinal data record comprising the timeline view for the person according to the dates of the several source data records and the event type;
transmitting the user interface including the electronic longitudinal data record comprising the timeline view for the person to the requestor.

10. The non-transitory computer readable medium of claim 9, wherein the requestor is selected from among:
a first party, claiming to be the person;
a second party, claiming to be acting for the person; and
a third party, that has not been authorized by the person.

11. The non-transitory computer readable medium of claim 10, wherein the requestor is selected as the first party, further comprising:
identifying the requestor based on responses matching demographic data stored in a demographic database in association with the person in the demographic database.

12. The non-transitory computer readable medium of claim 10, wherein the requestor is selected as the second party, further comprising:
identifying the requestor based on a relationship between the requestor and the person.

13. The non-transitory computer readable medium of claim 10, wherein the second party self identifies in the request as one of:
a parent of the person, wherein the person is a minor;
a legal guardian of the person;
a holder of a power of attorney for the person; and
a person authorized to provide medical treatment to the person.

14. The non-transitory computer readable medium of claim 13, wherein the person authorized to provide medical treatment to the person include a treatment role selected from:
a medical practitioner;
a medical support staff member; and
an administrative support staff member for a medical organization; and
wherein the treatment role for the person authorized to provide medical treatment is identified by a sign-on identity for a medical record application.

15. The non-transitory computer readable medium of claim 10, wherein the determined permissions specify data records of the event type for populating the electronic longitudinal data record in the user interface in response to requests from the third party.

16. The non-transitory computer readable medium of claim 9, wherein the data records include full-weight records stored in a data hub and links to full-weight records stored in external databases in communication with the data hub.

17. The non-transitory computer readable medium of claim 9, further comprising transmitting one or more of the data records for the person to the requestor based on the determined permissions.

18. The non-transitory computer readable medium of claim 9, wherein the determined permissions are received from the person and specify the event type that for inclusion in the user interface.

19. The non-transitory computer readable medium of claim 9, wherein identifying a unique identifier for the person comprises:
extracting an appended unique identifier from the request;
querying a unique identifier database with the appended unique identifier;
determining whether the appended unique identifier matches with an existing unique identifier stored in the unique identifier database associated with a person; and
in response to determining that the appended unique identifier matches an existing unique identifier stored in the unique identifier database associated with a person, assigning an existing root unique identifier associated with the person as the unique identifier, wherein the root unique identifier is map-able to the appended unique identifier, the existing unique identifier, and any other unique identifier stored in the unique identifier database that is associated with the person.

20. A system for providing secure access to longitudinal data including an electronic longitudinal data record, including:
a processor; and
a memory storage device including instructions that when executed by the processor:

identify a plurality of data formats used by a plurality of databases that store a plurality of data records associated with various persons;
identify a standardized data format;
receive a data record of the plurality of data records associated with a person from a database of the plurality of databases according to a data format of the plurality of data formats;
identify, based on contents of the data record associated with the person, a unique identifier for the person;
identify, based on the unique identifier and an identity of the database from which the data record was received, a retention policy;
in response to determining that the retention policy aggregates received data records:
  append the unique identifier to the data record associated with the person;
  normalize the data record associated with the person from the data format into the standardized data format; and
  store the normalized data record in association with prior data records for the person; and
in response to determining that the retention policy does not aggregate received data records:
  generate a link to the database from which the data record was received, wherein the link includes a portion of the contents of the data record;
  append the unique identifier to the link;
  store the link in association with the prior data records for the person;
receive, from a requestor, a request for the electronic longitudinal data record comprising a timeline view related to the person;
identify the requestor from whom the request was received;
determine permissions associated with the requestor in relation to the longitudinal data related to the person;
search for data records related to the person based on the determined permissions and the unique identifier, the data records including a date and an event type;
provide the electronic longitudinal data record for the person comprising the timeline view according to dates of several source data records created at different times and by disparate entities according to one or both of the link to the database from which the data record was received in association with the prior data records for the person and the normalized data record in association with the prior data records for the person;
generate a user interface that includes the electronic longitudinal data record comprising the timeline view for the person according to the dates of the several source data records and the event type; and
transmit the user interface that includes the electronic longitudinal data record comprising the timeline view for the person to the requestor.

21. The system of claim 20, wherein the requestor is identified as a first party, claiming to be the person;
wherein in response to selecting the requestor as the first party, the system is further configured to identify the requestor based on responses matching demographic data stored in a demographic database in association with the person in the demographic database.

22. The system of claim 20, wherein the requestor is identified as a second party having authorization from the first party to access the longitudinal data, wherein the second party self identifies in the request as one of:
a parent of the person, wherein the person is a minor;
a legal guardian of the person;
a holder of a power of attorney for the person; and
a person authorized to provide medical treatment to the person, wherein the person authorized to provide medical treatment to the person include a treatment role selected from:
a medical practitioner;
a medical support staff member; and
an administrative support staff member for a medical organization.

23. The system of claim 20, wherein the data records include full-weight records stored in an aggregated storage of the system and links to full-weight records stored in external databases in communication with the system.

24. The system of claim 20, wherein to identify the unique identifier for the person the system is further configured to:
extract demographic content from the data record or the request, wherein the demographic content includes at least one of:
  a name of the person;
  an address associated with the person;
  a date of birth associated with the person;
  a governmental identifier associated with the person; and
  a commercial identifier associated with the person;
query a demographic database with the demographic content;
determine whether the demographic content matches with a demographic information set stored in the demographic database associated with an existing unique identifier for the person;
in response to determining that the demographic content matches a demographic information set stored in the demographic database associated with the existing unique identifier:
  when the unique identifier is not included in the contents of the data record or the request, assign the existing unique identifier as the unique identifier; and
  update the demographic information set with the demographic content; and
in response to determining that the demographic content does not match any demographic information set stored in the demographic database associated with the existing unique identifier:
  create a new unique identifier for the person;
  assign the new unique identifier as the unique identifier;
  store the demographic content as a new demographic information set; and
  associate the new unique identifier with the new demographic information set.

25. The system of claim 20, wherein in identifying the unique identifier for the person, the system is further configured to:
extract an appended unique identifier from the data record;
query a unique identifier database with the appended unique identifier;
determine whether the appended unique identifier matches with an existing unique identifier stored in the unique identifier database associated with a person; and
in response to determining that the appended unique identifier matches an existing unique identifier stored in the unique identifier database associated with a person, assign an existing root unique identifier associated with the person as the unique identifier, wherein the root unique identifier is map-able to the appended unique identifier, the existing unique identifier, and any other unique identifier stored in the unique identifier database that is associated with the person.

\* \* \* \* \*